United States Patent [19]
Sun

[11] Patent Number: 6,004,898
[45] Date of Patent: Dec. 21, 1999

[54] ALKALINE EARTH METAL CONTAINING SMALL PORE NON-ZEOLITIC MOLECULAR SIEVE CATALYSTS

[75] Inventor: Hsiang-ning Sun, Drexel Hill, Pa.

[73] Assignee: Exxon Chemicals Patent Inc., Houston, Tex.

[21] Appl. No.: 09/153,797

[22] Filed: Sep. 15, 1998

Related U.S. Application Data

[62] Division of application No. 08/627,522, Apr. 4, 1996.

[51] Int. Cl.⁶ .................. B01J 27/182; B01J 21/08; C07C 1/00; C01B 25/14
[52] U.S. Cl. .................. 502/214; 502/240; 502/250; 502/411; 585/632; 585/640; 423/303; 423/DIG. 30
[58] Field of Search .................. 502/214, 240, 502/250, 411; 585/638, 640; 423/DIG. 30, 303

[56] References Cited

U.S. PATENT DOCUMENTS

| | | | |
|---|---|---|---|
| 4,066,714 | 1/1978 | Rodewald | 260/682 |
| 4,499,327 | 2/1985 | Kaiser | 585/640 |
| 4,636,482 | 1/1987 | Okado et al. | 502/60 |
| 4,677,242 | 6/1987 | Kaiser | 585/638 |
| 4,734,538 | 3/1988 | O'Connor et al. | 585/606 |
| 4,752,651 | 6/1988 | Kaiser | 585/640 |
| 4,758,419 | 7/1988 | Lok et al. | 423/306 |
| 4,861,739 | 8/1989 | Pellet et al. | 502/64 |
| 4,861,743 | 8/1989 | Flank et al. | 502/214 |
| 4,874,896 | 10/1989 | Olson et al. | 564/479 |
| 4,938,939 | 7/1990 | Kuznicki | 423/326 |
| 4,977,122 | 12/1990 | Eberly | 502/214 |
| 5,095,163 | 3/1992 | Barger | 585/640 |
| 5,104,515 | 4/1992 | Chu et al. | 423/DIG. 30 |
| 5,126,308 | 6/1992 | Barger et al. | 502/214 |
| 5,191,141 | 3/1993 | Barger et al. | 585/640 |
| 5,232,683 | 8/1993 | Clark et al. | 423/708 |
| 5,233,177 | 8/1993 | Barger | 585/640 |
| 5,240,891 | 8/1993 | Patton et al. | 502/214 |
| 5,242,675 | 9/1993 | Verduijn | 423/700 |
| 5,406,012 | 4/1995 | Davis | 585/277 |
| 5,663,471 | 9/1997 | Kvisle et al. | 423/700 |

FOREIGN PATENT DOCUMENTS

| | | | |
|---|---|---|---|
| 0 043 562 | 1/1982 | European Pat. Off. | C01B 25/36 |
| 0 103 117 | 3/1984 | European Pat. Off. | C01B 33/28 |
| 0 114 498 | 8/1984 | European Pat. Off. | C07C 1/20 |
| 0 226 219 | 6/1987 | European Pat. Off. | C01B 25/37 |
| 0 711 601 | 11/1994 | European Pat. Off. | B01J 29/08 |
| 0 659 105 | 6/1995 | European Pat. Off. | B01J 29/90 |
| 6-74134 | 9/1994 | Japan | C01B 33/34 |
| 2 128 972 | 5/1984 | United Kingdom | C01B 33/26 |
| WO 95/05342 | 2/1995 | WIPO | C01B 25/45 |

OTHER PUBLICATIONS

Grant, et al., "*Grant & Hackh's Chemical Dictionary*," Fifth Edition 1987 Month N/A.

*Primary Examiner*—Mark L. Bell
*Assistant Examiner*—Patricia L. Hailey
*Attorney, Agent, or Firm*—Bradley A. Keller

[57] ABSTRACT

The present invention is directed to a catalyst composition comprising a non-zeolitic molecular sieve and one or more alkaline earth metals selected from the group consisting of strontium, calcium, barium, and mixtures thereof, wherein said non-zeolitic molecular sieve has a pore diameter size of less than about 5 Angstroms.

15 Claims, 1 Drawing Sheet

ALKALINE EARTH METAL CONTAINING SMALL PORE NON-ZEOLITIC MOLECULAR SIEVE CATALYSTS

CROSS REFERENCE TO RELATED APPLICATIONS

The present application is a divisional application of currently U.S. patent application Ser. No. 08/627,522 which was filed on Apr. 4, 1996 and which is entitled "Use of Alkaline Earth Metal Containing Small Pore Non-Zeolitic Molecular Sieve Catalysts in Oxygenate Conversion." U.S. patent application Ser. No. 08/627,522 is hereby incorporated herein by reference in its entirety.

FIELD OF THE INVENTION

This invention relates to a process for the conversion of oxygenates to hydrocarbons using small pore non-zeolitic molecular sieve catalysts. More particularly, this invention relates to a catalyst composition, a method to prepare such a catalyst, and a process to use such a catalyst in a process for conversion of oxygenates to olefins using silicoaluminophosphate molecular sieve catalysts which have been incorporated with certain alkaline earth metals either during or after the synthesis of the molecular sieve.

BACKGROUND OF THE INVENTION

Olefins have traditionally been produced through the process of petroleum cracking. Because of the potential limited availability and high cost of petroleum sources, the cost of producing olefins from such petroleum sources has been steadily increasing. Light olefins such as ethylene and propylene serve as feeds for the production of numerous chemicals.

The search for alternative materials for the production of light olefins such as ethylene has led to the use of oxygenates such as alcohols, and more particularly to methanol and ethanol or their derivatives as feedstocks. These and other alcohols may be produced by fermentation or from synthesis gas. Synthesis gas can be produced from natural gas, petroleum liquids, and carbonaceous materials including coal, recycled plastics, municipal wastes, or any organic material. Thus, alcohol and alcohol derivatives may provide non-petroleum based routes for hydrocarbon production.

It is well known in the prior art to convert oxygenates to olefins by contacting the oxygenate with various types of catalysts. Large, medium, and small pore, zeolitic and non-zeolitic, molecular sieve catalysts may be used.

It is also well known in the prior art that molecular sieves of various pore diameters and compositions have been treated by addition of alkaline earth metals to improve catalyst performance for use in various applications. It is also well known that when comparing the performance of two catalysts, even if every physical parameter of each of the catalysts is the same, that if the two catalysts have a different composition, then one cannot predict based on the performance of one catalyst, how the second catalyst will perform. So even if a particular alkaline earth metal has been added to one type of catalyst for a particular use, it does not mean that the same metal will have the same beneficial effect on the performance of the second catalyst.

Even though the art teaches the use of some of the alkaline earth metals to improve the performance of large, medium and small pore zeolites, it fails to teach the use of all such alkaline earth metals, including strontium, calcium, and barium, to improve the performance of non-zeolitic molecular sieve catalysts with diameters of less than about 5 Angstroms for the use in oxygenate conversion.

U.S. Pat. No. 4,752,651 teaches the modification of small pore non-zeolitic molecular sieve catalysts using the alkaline earth metals of beryllium and magnesium. However, the prior art fails to teach and/or enable either the incorporation of the alkaline earth metals of strontium, calcium, and barium into small pore molecular sieves or the in situ inclusion of such metals into such a catalyst for the use in oxygenate conversion.

This failure to teach may be due to larger ionic radii of the cations with the higher atomic numbers in Group IIA. For example, beryllium and magnesium each have a size of 0.31 and 0.65 Angstroms, respectively. This is to be contrasted with the larger sizes of calcium, strontium, and barium with ionic radii of 0.99, 1.13, and 1.35 Angstroms, respectively. Based on this size difference, one of ordinary skill in the art would not think that these larger radii ions could be used as effectively in modifying a small pore catalyst. Even though all of these radii are less than 5 Angstroms, it is well known that the ions exist in the solvated form with the solvent molecules attached. Therefore, even though the metal ion has a radius of less than 5 Angstroms, in the solvated form the effective radius will be much larger.

Meanwhile, JP94074134 (JP01051316) discloses an in situ process which appears to be a method to make a small pore aluminophosphosilicate containing any one of the alkaline earth metals which is useful in an oxygenate conversion process. However, upon a close reading of the disclosure, this patent actually teaches the use of a medium pore catalyst, such as ZSM5, and not a small pore catalyst, such as SAPO-34, for oxygenate conversion. The disclosure focuses on how their catalyst is unique compared to a conventional ZSM-5. For example, their catalyst has a pore diameter of 5 to 6 Angstroms and an adsorption volume that is similar to that of common ZSM-5 type zeolites. The x-ray pattern of their material is similar to medium pore sized ZSM-5 and not similar to that of small pore sized SAPO-34. Their catalyst is described as a novel zeolite that has a pore diameter that is between large diameter zeolites, such as faujasite X and Y types, and small diameter zeolites, such as erionite and offretite which further distinguishes their catalyst from a small pore molecular sieve.

Therefore, based on the teachings of the prior art, it is surprising to learn that the alkaline earth metals of strontium, calcium, or barium can be successfully added to a small pore non-zeolitic molecular sieve for enhancement of the performance for such a catalyst for use in the oxygenate conversion process.

SUMMARY OF INVENTION

This invention provides a catalyst and a method to prepare the catalyst for use in converting a starting material to olefins. The catalyst comprises a non-zeolitic molecular sieve catalyst and one or more alkaline earth metals selected from the group consisting of strontium, calcium, barium, and mixtures thereof, wherein said no-zeolitic molecular sieve has a pore diameter size of less than about 5 Angstroms.

DETAILED DESCRIPTION OF THE INVENTION

Figure 1:
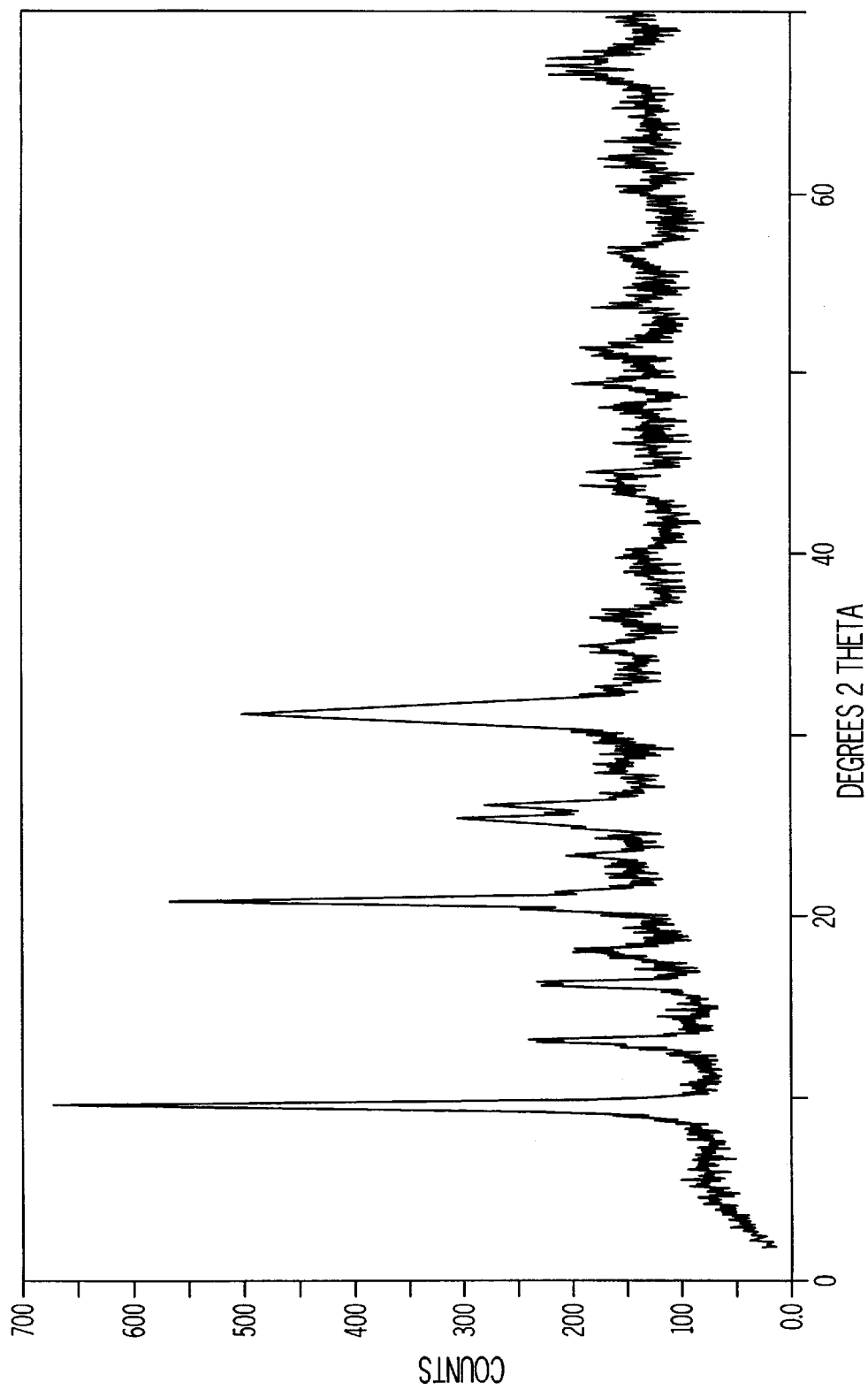
FIG. 1 shows an X-ray diffraction pattern for the strontium silicoaluminophosphate (Sr-SAPO) sample which was prepared per Example I as defined below.

The present invention is characterized by use of a small pore non-zeolitic molecular sieve catalyst, which has one or more of the alkaline earth metals, selected from the group consisting of strontium, calcium, barium, incorporated onto the molecular sieve either during or after synthesis, in a process for the conversion of starting material to olefins.

For this application, the non-zeolitic molecular sieve may be a silicoaluminophosphate (SAPO), an aluminophosphate (ALPO), and mixtures thereof, preferably, but not limited to, a SAPO catalyst. In the present invention, small pore non-zeolitic molecular sieves are defined as having a pore size of less than about 5.0 Angstrom units. Generally, suitable catalysts have a pore size ranging from about 3.5 to about 5.0 Angstroms units, preferably from about 4.0 to about 5.0 Angstroms, and most preferably from about 4.3 to about 5.0 Angstroms.

Non-zeolitic materials have been demonstrated to have catalytic properties for various types of hydrocarbon conversion processes. In addition, non-zeolitic materials have been used as adsorbents, catalyst carriers for various types of hydrocarbon conversion processes, and other applications. Non-zeolitic molecular sieves are complex three dimensional crystalline structures, which include either $AlO_2^-$ or $SiO_2$ or both $AlO_2^-$ and $SiO_2$ and a second metal oxide. The interstitial spaces or channels formed by the crystalline network enable non-zeolites to be used as molecular sieves in separation processes and catalysts for chemical reactions and catalyst carriers in a wide variety of hydrocarbon conversion processes.

SAPO's have a three-dimensional microporous crystal framework structure of $PO_2^+$, $AlO_2^-$, and $SiO_2$ tetrahedral units. The chemical composition (anhydrous) is:

$$mR:(Si_xAl_yP_z)O_2$$

wherein "R" represents at least one organic templating agent present in the intracrystalline pore system: "m" represents the moles of "R" present per mole of $(Si_xAl_yP_z)O_2$ and has a value of from zero to 0.3, the maximum value in each case depending upon the molecular dimensions of the templating agent and the available void volume of the pore system of the particular SAPO species involved, and "x", "y", and "z" represent the mole fractions of silicon, aluminum and phosphorus, respectively. Typical small pore SAPO's are SAPO-17, SAPO-18, SAPO-34, SAPO44, SAPO-56, and others. "R" may be removed at elevated temperatures either in the presence of or in the absence of oxygen.

ALPO's have a three-dimensional microporous crystal framework structure of $PO_2^+$ and $AlO_2^-$ tetrahedral units. The chemical composition (anhydrous) is:

$$mR:(Al_yP_z)O_2$$

wherein "R" represents at least one organic templating agent present in the intracrystalline pore system: "m" represents the moles of "R" present per mole of $(Al_yP_z)O_2$ and has a value of from zero to 0.3, the maximum value in each case depending upon the molecular dimensions of the templating agent and the available void volume of the pore system of the particular SAPO species involved, and "y" and "z" represent the mole fractions of aluminum and phosphorus, respectively. "R" may be removed at elevated temperatures.

The metal, which may be employed in either the in situ or incorporation process, is an alkaline earth metal selected from group consisting of strontium, calcium, barium, and mixtures thereof. Preferably, the metal is either strontium or calcium, and most preferably, the metal is strontium.

The metal containing compounds which may be used in the present invention may be of various compositions, including but not limited to, in the form of the corresponding halide, sulfate, formate, acetate, alkoxide, carbonyl, nitrate, or mixtures thereof. When the desired catalyst comprises SAPO-34 and the metal is strontium, it is preferable to use the hydrated form of strontium acetate as the metal containing compound.

The process of making the catalyst in-situ may be accomplished through any one of the standard methods well known to those skilled in the art including, but not limited to, hydrothermal synthesis under autogenic pressure at elevated temperatures. Typical precursors include, but are not limited to, aluminum oxide, aluminum trimethoxide, and aluminum triethoxide as the source of aluminum. Orthophosphoric acid, trimethyl phosphate, and triethyl phosphate are examples of typically used precursors for phosphorus. Colloidal silica, silica sol, silicon tetramethoxide, and silicon tetraethoxide are examples of typically used precursors for silica. Templates, which are often used in the synthesis process, include, but are not limited to, tetramethylammonium hydroxide and tetraethylammonium hydroxide.

In one embodiment, a reaction mixture is first prepared by mixing the desired amounts of the selected aluminum oxide and selected phosphoric acid with vigorous stirring. Next, de-ionized water and the desired amount of silica sol is added and the entire mixture is continued to be stirred to achieve complete mixing. Then, the selected organic template is added to this mixture and the resultant catalyst mixture is completely mixed by additional stirring. An aqueous solution containing the desired metal is then added to the mixture.

The aqueous solution of the desired metal is made by dissolving the desired amount of the metal containing compound in water under mild conditions. Preferably the water is de-ionized. The temperature of mixing is dependent upon the solubility of the metal compound in water. Alternatively, a medium other than water may be selected. The process may be conducted under pressure or at atmospheric pressure.

The resultant catalyst mixture, including the alkaline earth metal containing solution, is stirred as required. In some cases, stirring is not required and the mixture may be left undisturbed for a time adequate to permit the desired level of incorporation. The catalyst product is finally filtered, optionally washed, dried, and calcined by methods well known to those skilled in the art.

In another embodiment, the selected alkaline earth metal may be incorporated post synthesis through any one of the standard methods well known to those skilled in the art including, but not limited to, incipient wetness methods, ion-exchange, and mechanical mixing. In one embodiment, a solution of the desired metal is first made by dissolving the desired amount of the metal containing compound in water under mild conditions. Preferably the water is de-ionized. The temperature of mixing is dependent upon the solubility of the metal compound in water, or whatever other medium is selected. The process may be conducted under pressure or at atmospheric pressure.

After adequate mixing, the solution is then added to the selected amount of the molecular sieve. The resulting mixture is stirred as required. In some cases, stirring is not required and the mixture may be left undisturbed for a time adequate to permit the desired level of incorporation. The catalyst product is then filtered, optionally washed, dried, and calcined by methods well known to those skilled in the art.

For either method of preparation, either in-situ or post-synthesis, the amount of metal which is incorporated into the molecular sieve may vary over a wide range depending, at least in part, on the method of preparation, the selected molecular sieve catalyst, and the incorporation method.

The resulting composition of the prepared Sr-, Ca-, and Ba-SAPO's may be expressed as follows:

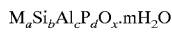

$$M_a Si_b Al_c P_d O_x \cdot m H_2O$$

wherein, M=an alkaline earth metal selected from the group consisting of Sr, Ca, Ba, and mixtures thereof,
the ratio of a to b=0.01 to 2,
b=0.01 to 0.3,
c=at least 0.05,
d=at least 0.05,
b+c+d=1.0,
the ratio of b to c is less than 0.8,
x=to balance the charge, and
m=0 to 100.

The amount of metal incorporated is measured on an atomic metal basis in terms of metal to silicon ratio. The metal to silicon atomic ratios are in the range from about 0.01:1 to about 2:1, preferably from about 0.05:1 to about 1.5:1, and most preferably from about 0.1:1 to about 1:1.

The conversion process employs a starting material (feedstock) comprising "oxygenates". As used herein, the term "oxygenates" is intended to comprise aliphatic alcohols, ethers, carbonyl compounds (aldehydes, ketones, carboxylic acids, carbonates, and the like) along with also those compounds containing hetero-atoms, e.g., halides, mercaptans, sulfides, amines, and mixtures thereof. The aliphatic moiety preferably contains from 1 to 10 carbon atoms and more preferably contains 1 to 4 carbon atoms. Representative oxygenates include, but are not limited to, lower straight or branched chain aliphatic alcohols, their unsaturated counterparts and the nitrogen, halogen and sulfur analogues of such. Examples of suitable compounds include, but are not limited to: methanol; ethanol; n-propanol; isopropanol; $C_4$–$C_{20}$ alcohols; methyl ethyl ether; dimethyl ether; diethyl ether; di-isopropyl ether; methyl mercaptan; methyl sulfide; methyl amine; ethyl mercaptan; di-ethyl sulfide; di-ethyl amine; ethyl chloride; formaldehyde; di-methyl carbonate; di-methyl ketone; acetic acid; and n-alkyl amines, n-alkyl halides, n-alkyl sulfides, each having n-alkyl groups of 3 to 10 carbon atoms; and mixtures thereof. The term "oxygenate" as employed herein designates only the organic material used as the feed. The total charge of feed to the reaction zone may contain additional compounds such as diluents.

The conversion process is preferably carried out in the vapor phase such that the feedstock is contacted in a vapor phase in a reaction zone with the defined molecular sieve catalyst at effective process conditions so as to produce the desired olefins, i.e., an effective temperature, pressure, WHSV (Weight Hourly Space Velocity) and, optionally, an effective amount of diluent, correlated to produce olefins. Alternatively, the process may be carried out in a liquid phase. When the process is carried out in the liquid phase, different conversions and selectivities of feedstock-to-product may result with respect to the relative ratios of the light olefin products as compared to that formed by the vapor phase process.

The temperature, which may be employed in the conversion process, may vary over a wide range depending, at least in part, on the selected molecular sieve catalyst. The process is conducted at an effective temperature range from about 200° C. to about 700° C., preferably from about 250° C. to about 600° C., and most preferably from about 300° C. to about 500° C. Temperatures outside the stated preferred ranges are not excluded, although they do not fall within certain desirable embodiments of the present invention. At the lower end of the temperature range, and thus, generally, at a lower rate of reaction, the formation of the desired light olefin products may become markedly slow. At the upper end of the temperature range and beyond, the process may not form an optimum amount of light olefin products.

The process is effectively carried out over a wide range of pressures including autogeneous pressures. At pressures in the range from about 0.1 kPa to about 100 MPa, the formation of light olefin products will be effected although the optimum amount of product will not necessarily form at all pressures. The preferred pressure is in the range from about 6.9 kPa to about 34 Mpa, with the most preferred range being from about 48 kPa to about 0.34 MPa. The pressures referred to herein for the process are exclusive of the inert diluent, if any, that is present, and refer to the partial pressure of the feedstock as it relates to oxygenate compounds and/or mixtures thereof. Pressures outside the stated range are not excluded from the scope of this invention, although such do not fall within certain desirable embodiments of the invention. At the lower and upper end of the pressure range, and beyond, the selectivity's, conversions and/or rates to light olefin products may not occur at the optimum, although light olefins such as ethylene may still be formed.

The process is effected for a period of time sufficient to produce the desired olefin products. In general, the residence time employed to produce the desired product can vary from seconds to a number of hours. It will be readily appreciated that the residence time will be determined to a significant extent by the reaction temperature, the pressure, the molecular sieve selected, the Weight Hourly Space Velocity (WHSV), the phase (liquid or vapor), and the process design characteristics selected.

The process is effectively carried out over a wide range of WHSV for the feedstock and is generally in the range from about 0.01 hr$^{-1}$ to about 500 hr$^{-1}$, preferably from about 0.1 hr$^{-1}$ to about 200 hr$^{-1}$, and most preferably from about 0.5 hr$^{-1}$ and 100 hr$^{-1}$. As the catalyst may contain other materials, which act as inerts, the WHSV, is calculated on the weight basis of methanol (MeOH) and small pore molecular sieve used. WHSV is thus defined as:

$$\frac{\text{feed rate of MeOH}}{\text{wt. of mol sieve in reactor zone(s)}}$$

The conversion process may optionally be carried out in the presence of one or more inert diluents which may be present in the feedstock for example in an amount between 1 and 99 molar percent, based on the total number of moles of all feed and diluent components fed to the reaction zone (or catalyst). Typical of diluents, which may be employed in the instant process, are helium, argon, nitrogen, carbon monoxide, carbon dioxide, hydrogen, water, paraffins, hydrocarbons (such as methane), aromatic compounds, and mixtures thereof. The preferred diluents are water and nitrogen.

The olefin production process may be carried out in a batch, semi-continuous or continuous fashion. The process can be conducted in a single reaction zone or a number of reaction zones arranged in series or in parallel, or it may be conducted intermittently or continuously in an elongated tubular zone or a number of such zones. When multiple reaction zones are employed, it may be advantageous to employ one or more of the defined small pore molecular sieves in series to provide for a desired product mixture.

Owing to the nature of the process, it may be desirous to carry out the process of the present invention by use of the molecular sieve catalysts in a dynamic bed system or any system of a variety of transport beds rather than in a fixed bed system. Such systems would readily provide for any regeneration (if required) of the molecular sieve catalyst after a given period of time. If regeneration is required, the molecular sieve catalyst can be continuously introduced as a moving bed to a regeneration zone where it can be regenerated, such as for example by removing carbonaceous materials or by oxidation in an oxygen-containing atmosphere. In the preferred practice of the invention, the catalyst will be subject to a regeneration step by burning off carbonaceous deposits accumulated during the conversion reactions.

The following examples illustrate, but do not limit, the present invention.

EXAMPLES

Catalysts were prepared and then tested for methanol conversion.

Catalyst Preparation Examples

Comparative Example

SAPO-34 was prepared according to U.S. Pat. No. 4,440,871 to provide a basis for comparison with the examples of alkaline earth metal incorporated small pore molecular sieve catalysts as prepared by the methods as described above.

Example I

The Invention

Sr-SAPO-34 was prepared as follows. A strontium containing solution was prepared by dissolving 0.22 grams of strontium acetate in 20 ml of de-ionized water at room temperature. This solution was added to 3.12 grams of SAPO-34 and the mixture was stirred for two hours, also at room temperature. The solid catalyst product was filtered, and then washed two times, each with 20 ml of de-ionized water. The finished catalyst product was then dried at 110° C. for two hours, followed by calcination at 650° C. for sixteen hours. The resulting catalyst had a metal loading of 3.55 wt. % strontium.

Example II

The Invention

Ca-SAPO-34, was prepared as follows. A calcium containing solution was prepared by dissolving 0.184 grams of calcium acetate in 20 ml of de-ionized water at room temperature. This solution was added to 3.014 grams of SAPO-34 and the mixture was left to stand at room temperature for twenty four hours. The finished catalyst was filtered, and then dried at 110° C. for two hours. The resulting dried catalyst was then calcined at 650° C. for 16 hours. The resulting catalyst had a metal loading of 1.4 wt. % calcium.

Example III

The Invention

Ba-SAPO-34, was prepared as follows. A barium containing solution was prepared by dissolving 0.266 grams of barium acetate in 20 ml of de-ionized water at room temperature. This solution was added to 3.136 grams of SAPO-34 and the mixture was left to stand at room temperature for twenty four hours. The finished catalyst was filtered, and then dried at 110° C. for two hours. The resulting dried catalyst was then calcined at 650° C. for 16 hours. The resulting catalyst had 4.56 wt. % barium.

Example IV

The Invention

A reaction mixture is prepared by mixing 40.2 grams of aluminum isopropoxide, $Al[O-CH(CH)_2]_3$ and 72.6 grams of 25.1% orthophosphoric acid with vigorous stirring. Next, 3 ml of de-ionized water and 7.2 grams of 25 wt % silica sol are added and the entire mixture is stirred for one hour in a closed container. 15 grams of 40 wt % tetraethylammonium hydroxide are then added to this mixture and the resultant mixture is stirred for another hour in the same closed container. Once this mixture is stirred, an aqueous solution containing 1.1 grams of strontium acetate $Sr[OOCCH_3]_2$ and 11 ml of water is added. The entire mixture is stirred for thirty minutes and transferred to a Teflon™ lined autoclave and heated to 195° C. under autogenic pressure for 168 hours. Centrifugation and filtration, followed by washing with de-ionized water recover the recovered product. The solid is dried at 110° C. for two hours, followed by calcination at 550° C. for sixteen hours to give a strontium silicoaluminophosphate product with the following composition:

$$Sr_{0.01}Si_{0.072}Al_{0.292}P_{0.159}O \cdot mH_2O$$

The structure is similar to SAPO-34. The resulting strontium to silicon atomic ratio measured in terms of an atomic weight basis will be about 0.14 to 1.

Conversion Examples

Each of the prepared catalysts, the comparative and the two metal treated catalysts, was then tested using the following procedure. 5.0 cc (approximately 2.8 grams) of the selected SAPO-34 catalyst, were mixed with 15 cc of quartz beads and loaded into a ¾" outer diameter 316 stainless steel tubular reactor which was heated by a three-zone electric furnace. The first zone, acting as the preheating zone, vaporized the feed. The temperature of the center zone of the furnace was adjusted to give the desired reaction temperature of 450° C. The reactor was purged first with nitrogen at 50 cc/min. flow rate for 30 minutes. The feed, containing 30.8 wt. % methanol, equivalent to a 4:1 (molar ratio) of water and methanol, was pumped into the reactor and calibrated to give a flow rate of about 0.7 $hr^{-1}$ WHSV at a pressure of about 3 psig. In each case, the methanol conversion was 100%. The effluent was analyzed at predetermined intervals by an on-line gas chromatograph fitted with both a thermal conductivity detector and a flame ionization detector.

The results are shown in the following table.

| Olefins Yield | Comparative SAPO-34 | Invention Sr-SAPO-34 | Invention Ca-SAPO-34 | Invention Ba-SAPO-34 |
|---|---|---|---|---|
| Ethylene, wt. % | 49.2 | 67.1 | 52.3 | 50.3 |
| Propylene, wt. % | 34.0 | 22.4 | 34.7 | 35.3 |
| Total of $C_2^=$ and $C_3^=$, wt. % | 83.2 | 89.5 | 87.0 | 85.6 |
| Ethylene to propylene ratio | 1.3 | 2.3 | 1.5 | 1.4 |

The examples illustrate an increase of over 36% in the ethylene yield using the Sr-SAPO-34 catalyst, as compared to the untreated SAPO-34 catalyst. The examples illustrate an increase of over 7% in the combined ethylene and propylene yield using the Sr-SAPO-34 catalyst, as compared to the untreated SAPO-34 catalyst. The Ca-SAPO-34 and Ba-SAPO catalysts achieved a respective 6% and 2% increase in ethylene yield as compared to the untreated SAPO-34 catalyst. The combined ethylene and propylene yield also increased by 5% and 3% respectively.

Thus, in the conversion of a starting material to olefins, the use of a small pore non-zeolitic molecular sieve is enhanced by the addition of one or more of the alkaline earth metals of strontium, calcium, and barium, either during or post catalyst synthesis.

Persons of ordinary skill in the art will recognize that many modifications may be made to the present invention without departing from the spirit and scope of the present invention. The embodiments described herein are meant to be illustrative only and should not be taken as limiting the invention, which is defined in the following claims.

What is claimed is:

1. A catalyst composition, comprising a non-zeolitic molecular sieve catalyst and one or more alkaline earth metals selected from the group consisting of strontium, calcium, barium, and mixtures thereof, wherein said non-zeolitic molecular sieve catalyst comprises pores having a diameter of about 5 Angstroms or less.

2. The catalyst composition of claim 1, wherein the non-zeolitic molecular sieve catalyst comprises silicon and wherein said catalyst has an alkaline earth metal to silicon atomic ratio in a range from about 0.01:1 to about 2:1.

3. The catalyst composition of claim 1, wherein the non-zeolitic molecular sieve catalyst comprises silicon and wherein said catalyst has an alkaline earth metal to silicon atomic ratio in a range from about 0.05:1 to about 1.5:1.

4. The catalyst composition of claim 1, wherein the non-zeolitic molecular sieve catalyst comprises silicon and wherein said catalyst has an alkaline earth metal to silicon atomic ratio in a range from about 0.1:1 to about 1:1.

5. The catalyst composition of claim 1, wherein said non-zeolitic molecular sieve catalyst comprises a silica component, a first metal oxide comprising an alumina component, and a second metal oxide wherein said alumina component and a silica component have a silicon to aluminum atomic ratio of about 0.8 or less.

6. The catalyst composition of claim 1, wherein said non-zeolitic molecular sieve has the following formula:

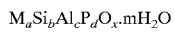

wherein, M is an alkaline earth metal selected from the group consisting of Sr, Ca, Ba and mixtures thereof;
a to b is at a ratio of from about 0.01:1 to about 2:1;
b is from about 0.01 to about 0.3;
c is at least about 0.05;
d is at least about 0.05;
b+c+d=1.0;
b:c is about 0.8 or less;
x comprises a quantity effective to balance a charge attributable to said $M_aSi_bAl_cP_d$; and
m is from about 0 to 100.

7. The catalyst composition of claim 1, wherein said non-zeolitic molecular sieve catalyst is a Sr-SAPO-34.

8. The catalyst composition of claim 7, wherein said non-zeolitic molecular sieve catalyst further comprises strontium acetate.

9. The catalyst composition of claim 6, wherein said non-zeolitic molecular sieve catalyst is a Ca-SAPO-34.

10. The catalyst composition of claim 6, wherein said non-zeolitic molecular sieve catalyst is a Ba-SAPO-34.

11. The catalyst composition of claim 1, wherein said non-zeolitic molecular sieve catalyst has the following composition:

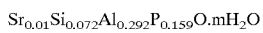

wherein strontium to silicon is present at an atomic ratio of about 0.14 to 1.

12. A post-synthesis process for preparing a catalyst composition according to claim 1 comprising:

(a) forming a mixture in a solvent comprising one or more alkaline earth metals selected from the group consisting of strontium, calcium, barium, and mixtures thereof; and (b) treating a non-zeolitic molecular sieve catalyst having a pore diameter of about 5 Angstroms or less with said mixture under conditions effective to incorporate said alkaline earth metals into said non-zeolitic molecular sieve catalyst having a metal to silicon atomic ratio of from about 0.01:1 to about 2:1.

13. The process of claim 12 wherein said non-zeolitic molecular sieve catalyst is selected from the group consisting of a silicoaluminophosphate non-zeolitic molecular sieve catalyst, an aluminophosphate non-zeolitic molecular sieve catalyst, and mixtures thereof.

14. An in-situ process for preparing a catalyst composition according to claim 1 comprising:

(a) forming a reaction mixture comprising precursors required for producing a non-zeolitic molecular sieve and one or more sources of alkaline earth metals selected from the group consisting of strontium, calcium, barium, and mixtures thereof; and (b) subjecting said mixture to conditions effective to produce said non-zeolitic molecular sieve catalyst composition having a pore diameter size of about 5 Angstroms or less.

15. The process of claim 1 wherein said non-zeolitic molecular sieve catalyst is selected from the group comprising a silicoaluminophosphate, an aluminophosphate, and mixtures thereof.

* * * * *